United States Patent
Jacoby et al.

(10) Patent No.: US 8,094,838 B2
(45) Date of Patent: Jan. 10, 2012

(54) VOICE COMMAND OF AUDIO EMITTING DEVICE

(75) Inventors: Keith A. Jacoby, Rochester, NY (US); Chris W. Honsinger, Ontario, NY (US)

(73) Assignee: Eastman Kodak Company, Rochester, NY (US)

(*) Notice: Subject to any disclaimer, the term of this patent is extended or adjusted under 35 U.S.C. 154(b) by 1310 days.

(21) Appl. No.: 11/623,107

(22) Filed: Jan. 15, 2007

(65) Prior Publication Data

US 2008/0172221 A1  Jul. 17, 2008

(51) Int. Cl.
*H03G 3/20* (2006.01)
*H04R 3/00* (2006.01)

(52) U.S. Cl. ............ 381/110; 379/88.01; 367/198; 708/420; 455/563

(58) Field of Classification Search .......... 381/110, 381/66, 91, 92, 122, 87, 150; 455/563, 550.1; 379/406.03, 406.11, 406.06, 406.02, 406.01, 379/392.01, 88.01, 88.02, 88.03, 88.04; 708/200, 708/100, 315, 300; 704/275, 270
See application file for complete search history.

(56) References Cited

U.S. PATENT DOCUMENTS

| | | | |
|---|---|---|---|
| 5,267,323 A | 11/1993 | Kimura | |
| 5,428,604 A | 6/1995 | Fuda | |
| 5,740,242 A | 4/1998 | Hayashi | |
| 6,411,928 B2 | 6/2002 | Tsurufuji et al. | |
| 7,440,891 B1* | 10/2008 | Shozakai et al. | 704/233 |
| 7,545,926 B2* | 6/2009 | Mao | 379/406.08 |
| 2004/0001689 A1 | 1/2004 | Goldsmith | |
| 2007/0173289 A1* | 7/2007 | Huang et al. | 455/563 |

FOREIGN PATENT DOCUMENTS

| | | |
|---|---|---|
| EP | 1 675 374 | 6/2006 |
| WO | 2004/014055 | 2/2004 |

OTHER PUBLICATIONS

S. Makino, et al, "Acoustic Echo Canceller Algorithm Based on the Variation Characteristics of a Room Impulse Response", Apr. 3, 1990, pp. 1133-1136.

* cited by examiner

*Primary Examiner* — Vivian Chin
*Assistant Examiner* — Con P Tran
(74) *Attorney, Agent, or Firm* — Raymond L. Owens

(57) ABSTRACT

A method of extracting a voice command produced in an enclosed or partially enclosed environment, includes providing an impulse response signal of the enclosed or partially enclosed environment; recording the voice command and ambient sounds; and using the impulse response signal to extract the recorded voice command.

3 Claims, 3 Drawing Sheets

VOICE COMMAND OF AUDIO EMITTING DEVICE

FIELD OF THE INVENTION

The invention relates generally to the field of audio processing, and in particular to extracting voice commands from sounds emitted from an audio emitting device in an enclosed or partially enclosed environment.

BACKGROUND OF THE INVENTION

Most modern consumer electronic devices have some form of handheld remote control. Recently, there has been much work in the voice command remote control area. For example, in an audio-video playback system a device can have a conventional handheld infrared remote control with a microphone built in for accepting voice commands and converting the command into an infrared signal that is transmitted to the device. Other techniques for voice command include multiple microphone systems in which one microphone senses the voice command and ambient noise, and another microphone picks up only ambient noise, allowing for isolation of the voice command through subtraction of the ambient signal.

Many techniques exist for reducing sensitivity to ambient noise. In voice command driven remote controlled devices, there exists the problem of isolating the ambient sound from the command. For example, U.S. Pat. No. 6,411,928 (Sanyo Electric) describes a method in which an electrical signal corresponding to ambient noise is used to set a threshold value in accordance with the level of the ambient noise. A voice signal applied to a microphone is cut out for processing if it exceeds the threshold value. In another voice-operated remote control system U.S. Pat. No. 5,267,323 (Pioneer Electronic Corp), a two-microphone system has one microphone receives a voice command and the other receiving the ambient noise. An ambient noise remover cancels an ambient noise component with an electric signal of the ambient noise picked up by the other microphone, leaving only the voice command component. In both of these cases, the ambient noise refers to sounds in the acoustic environment as well as sounds emitted by the device being controlled. When the sound level from the device is sufficiently loud, the ability for the system to recognize the voice command generally suffers, in part due to room reflections and other acoustic phenomena.

SUMMARY OF THE INVENTION

The present invention is directed to overcoming the problem set forth above. Briefly summarized and according to one aspect of the present invention, a method is disclosed for extracting voice commands.

In accordance with another aspect of the present invention, a method is provided for extracting a voice command produced in enclosed or partially enclosed environment, comprising:

(a) providing an impulse response signal of the enclosed or partially enclosed environment;

(b) recording the voice command and ambient sounds; and (c) using the impulse response signal to extract the recorded voice command.

The above and other objects of the present invention will become more apparent when taken in conjunction with the following description and drawings wherein identical reference numerals have been used, where possible, to designate identical elements that are common to the figures.

These and other aspects, objects, features and advantages of the present invention will be more clearly understood and appreciated from a review of the following detailed description of the preferred embodiments and appended claims, and by reference to the accompanying drawings.

The present invention has the advantage of allowing an operator to speak voice commands to a sound-emitting device and allows the sound-emitting device to recognize the command despite interfering sounds.

DETAILED DESCRIPTION OF THE INVENTION

Figure 1:
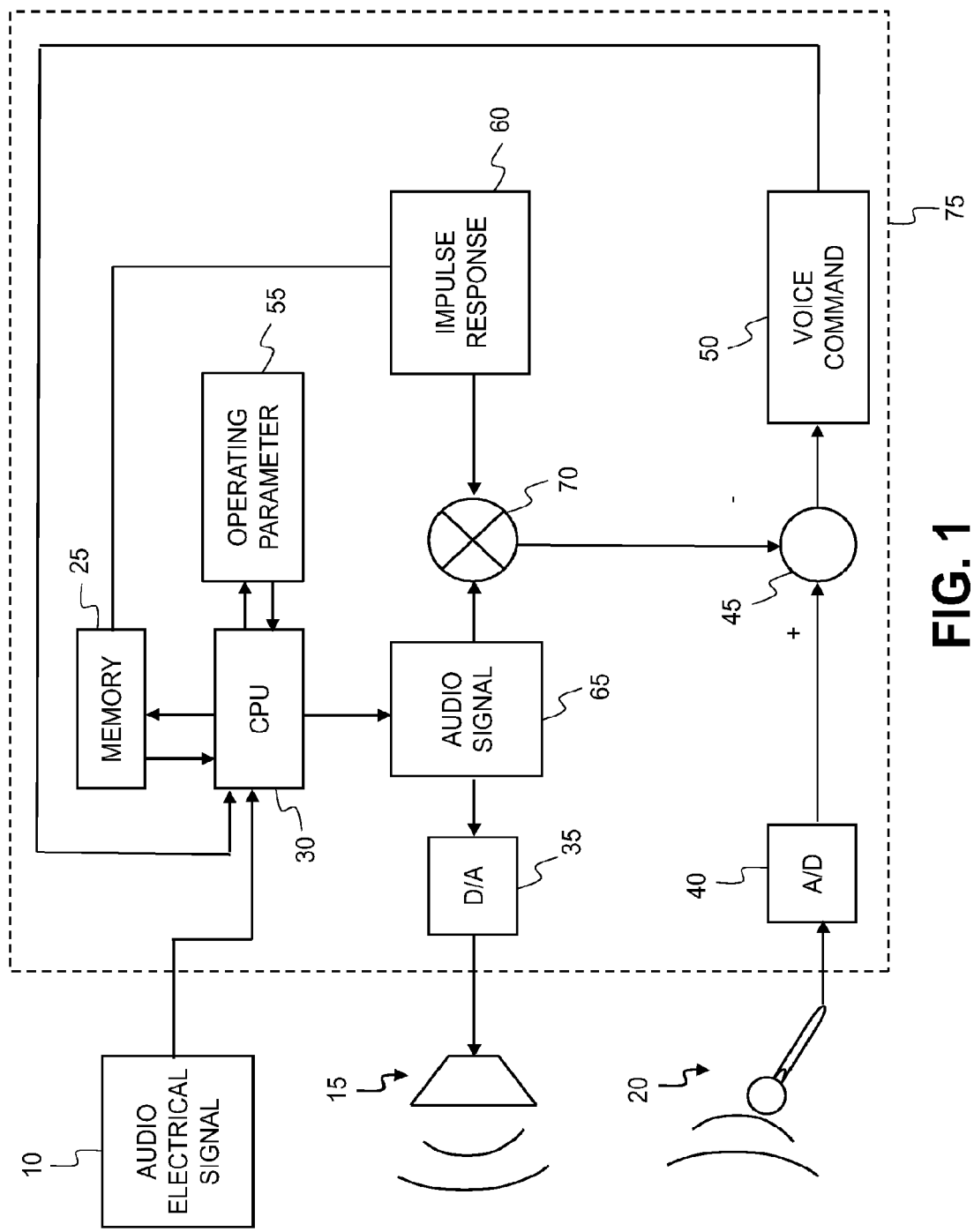
FIG. 1 is block diagram that depicts an embodiment of the invention.

In the following description, the present invention will be described in its preferred embodiment. Those skilled in the art will readily recognize that the equivalent the invention can also exist in other embodiments. A device that emits audio (such as a home entertainment or audio-video playback system) includes, among any number of components, one or more speakers that project sound into the environment. This sound radiates outward from the device, gets absorbed and/or reflected by the objects and walls within the space. Reflections from all of the objects and walls are incident upon the device a short time later. The absorption and reflection of the sound in the room, combined with the device's electronic and acoustic-mechanical effect on the audio signal in the acoustic space, can be characterized by an impulse response, which inherently includes frequency attenuations and time delays. An impulse response is well known in the scientific and engineering community is that response associated with the emission of a short duration of energy. Typically, the duration is small enough in time to guarantee that all frequencies are present in the Fourier transform of the impulse. The present invention makes use of the impulse response of an enclosed or partially enclosed environment to extract voice signals.

The impulse response is derived by emitting an impulsive signal from the device into the room, and then measuring the sound characteristics of the impulse as it is sensed from a microphone located on the device. The resulting impulse response is then stored.

A linear system can be characterized by its impulse response signal. In the art of exploration geophysics, dynamite is exploded near the surface of the earth and phones are used to receive the resulting signal. The explosion is like an impulse and the phones receive the result of the impulse convolving with the subsurface layers of the earth. This data is used to form a subsurface picture of the earth or what is commonly called a seismogram. What started as an impulse of very short duration ends up as a time series of energy comprised of many reflections and is spread over a significantly longer time. The recorded result is an impulse response and can be used to simulate the resulting time series of any other signal introduced into the earth in that area of a similar bandwidth.

The present invention is applicable in an enclosed or partially enclosed environment. For example, the present invention can be practiced in a room within a home or within a commercial building. The room can be fully enclosed or partially enclosed. An impulsive sound emitted from an audio-emitting device reflects from walls, lamps, tables and floors and the net result is that a recording of the impulsive sound would be spread over time. If the room opens to a substantially open area, some of the impulsive sound emitted is lost, however, this loss of energy does not detract from the characterization of the partially enclosed environment. The recording, like the seismogram in geophysics, can serve as a way to characterize the living room; it is the impulse response of the room.

FIG. 1, depicts the components of an audio emission device 75. In a preferred embodiment, this audio emission device 75 is a stereo connected to a digital cable feed, that provides an audio electrical signal 10 that is for the sake of discussion, a digital representation of music. The feed could also be an internet connection, an antenna that converts analog signals to digital or converting an analog signal from a cable connection.

Housed within the stereo is a CPU 30 and a memory 25 that contains computer programs. The memory 25 is preferably random access memory or serial access memory that can be used for any purpose. Because in a preferred embodiment, the invention uses computer programs, some form of memory that maintains its contents when the stereo is turned off is preferred. Using wireless technology, it is understood that many of the components depicted in FIG. 1 could be housed outside of the audio emission device 75. For example, the CPU 30 and memory 25 could be housed by a personal computer that communicates commands via a wireless protocol.

Assume that the audio emission device has stored an impulse response 60 of the room in memory 25. That is, assume that the step of obtaining the impulse response has been performed in another step. This step shall be described later.

Assume that the audio emission device 75 is currently playing classical music and that no user voice commands are present in the room. Under this circumstance the audio electrical signal 10 is received by the audio emission device 75 and is channeled or demultiplexed through the CPU 30 to produce an audio signal 65, which is then converted to an analog signal 35 and piped to a speaker 15. A microphone 20 is always on and converting the environmental sounds into digital representations using an analog to digital converter 40. Microphone 20 receives classical music without any voice command. The impulse response 60 represents the mathematical data needed to simulate what the output sound would be received as at microphone 20. When the audio signal 65 is convolved with the impulse response 60, the result would be substantially the same as the signal after the analog to digital step 40. The difference between the convolved sound at output at step 70 and the received digital sound received at step 40 is performed by a difference operator 45, and would be small or zero. Therefore, in the absence of a voice command or other extraneous sound, the amplitude of the signal at a voice command step 50 would be small or zero because the signals are substantially the same.

Figure 2:
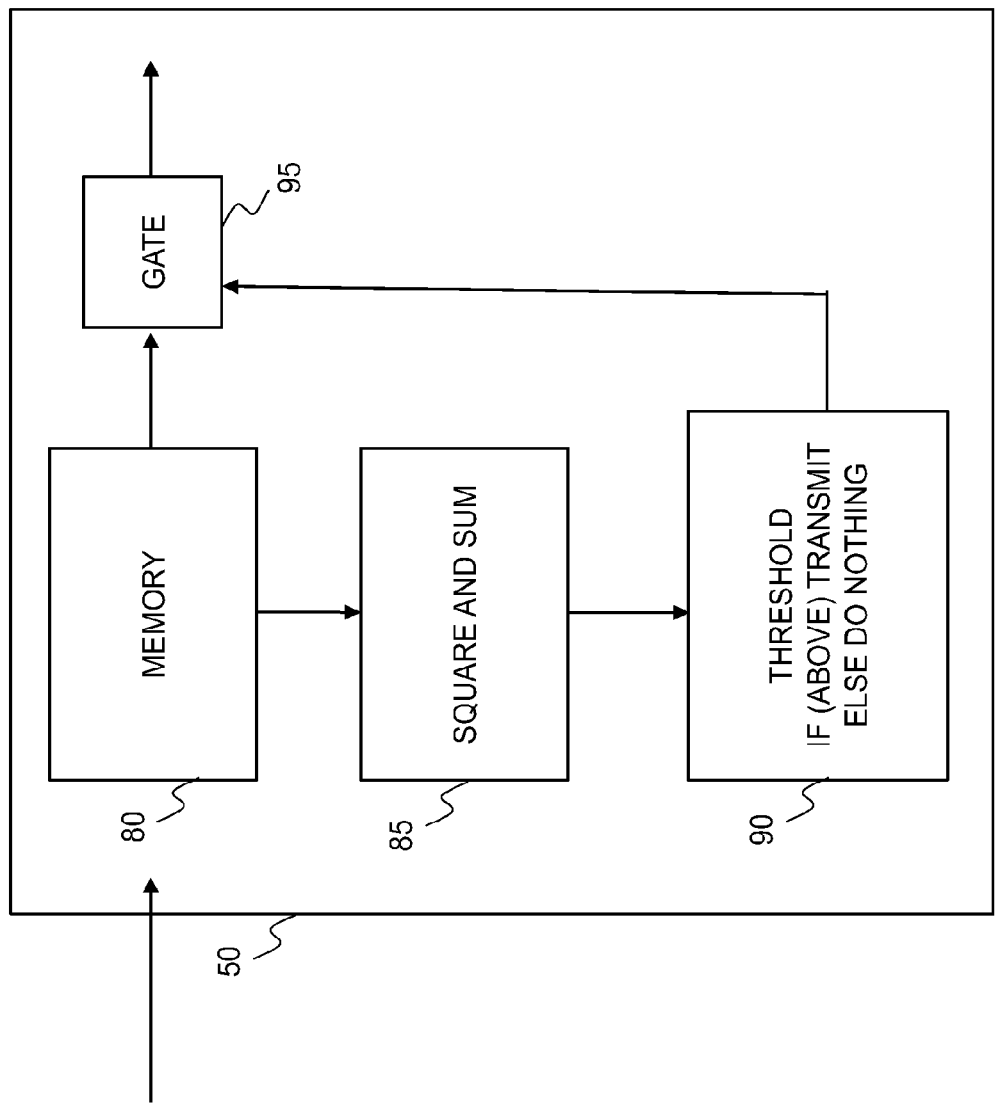
FIG. 2 depicts in detail the voice command block of FIG. 1.

The voice command step 50 has a thresholding operation to eliminate low amplitude extraneous sounds occurring in the room or elsewhere. Referring now to FIG. 2, an expanded view of the voice command step 50 is depicted. A buffer memory 80 is provided to buffer the signal at the entry of the voice command step 50. Enough memory should be provided to store the longest (in time) voice command expected by the user. 512 kilobytes is sufficient for most applications. A running average square and sum of the signal values in the buffer memory 80 is computed in the square and sum step 85. This running sum is tested against a thresholding operation 90.

When the running sum is lower than a constant threshold, successive values contained in the memory 80 are discarded in the gate operation 95. This threshold is best determined empirically within the design process of the audio emission device because of the variation of the microphone gains due to design and other considerations. To determine a reasonable threshold, it is recommended that the average squared sum of the signal values be calculated for a typical persons' utterance of a command lasting 1 second at a normal conversation amplitude level. Therefore, returning to the case wherein only classical music is played and no voice commands are present, the thresholding step 90 would signal the gate operation 95 that no voice command is present and no signal would be sent to the CPU 30.

In the case wherein a voice command is present, the average summed square of the signal entering the voice command 50 step is larger than the threshold step 90. In this case the threshold step 90 signals to the gate step 95 that a voice command is present and the gate releases the contents of the memory 80 to the CPU 30. This data needs to be interpreted by the CPU 30 and memory 25 in order to change an operating parameter 55 (FIG. 1). The interpretation of the voice command resides in the field of speech recognition. It is appreciated that this field is extremely rich in variety in that many different algorithms can be used. In a preferred embodiment, the user is expected to prefix every command with the phrase "command" in order to filter out ordinary conversation occurring near the audio emitting device. That is, if one wants to change the channel a user should state "command channel up", for example. The CPU 30 can search for the word "command" to eliminate extraneous sounds or conversations from interpretation. Next it interprets the word "channel" which in turn signals the expectation of the word "up" or "down". In the present case the word "up" is determined as being present and the CPU 30 issues a operating parameter 55 change order and the channel is incremented. Other example commands are "command off", signaling the system to turn itself off or "command find Beethoven", signaling the system to scan a network or library to find instances of the artist Beethoven.

Using the prefix "command" on voice commands can be shown to decrease the sophistication of the CPU 30 needed to interpret the voice commands. As speech recognition technologies improve, it expected that this advantage will become superfluous. Many companies presently provide speech interpretation software and hardware modules. One such company is Sensory Inc. located at 1500 NW 18$^{th}$ Avenue, in Portland Oreg.

At the heart of this invention is the need for the impulse response 60. The impulse response 60 can be calculated once or every time the system is turned on or periodically. In a preferred embodiment, the impulse response 60 is calculated as part of the boot up sequence associated with turning the system on. That is, the operating system associated with the CPU 30, signals the issuance of a impulse response calculation every time the system is turned on.

There are multiple ways to calculate the impulse response 60 of an enclosed or partially enclosed environment. The simplest is to synthesize a pulse of high energy and short duration (a delta function) from the CPU 30 and the memory 25 into an audio signal 65 and transmit the pulse out to the speaker 15 and receive the impulse response 60 of the enclosed or partially enclosed environment at the microphone 20 and ensuring that the amplitude of the impulse response is high enough to pass through the voice command thresholding operation 90 (FIG. 2) and storing it in the impulse response memory 60.

A problem with the above approach is that emitting an impulsive sound of high energy and short duration is annoying to consumers. An alternative approach is to synthesize a chirp signal using the CPU 30 and memory 25 of frequencies starting from 20 Hz and ending at 20 KHz, the range of human hearing. The functional form of a chirp is:

$$c(t) = \alpha \cos(\alpha t^2 + \beta t) \qquad \text{Eq. 1}$$

Figure 3:
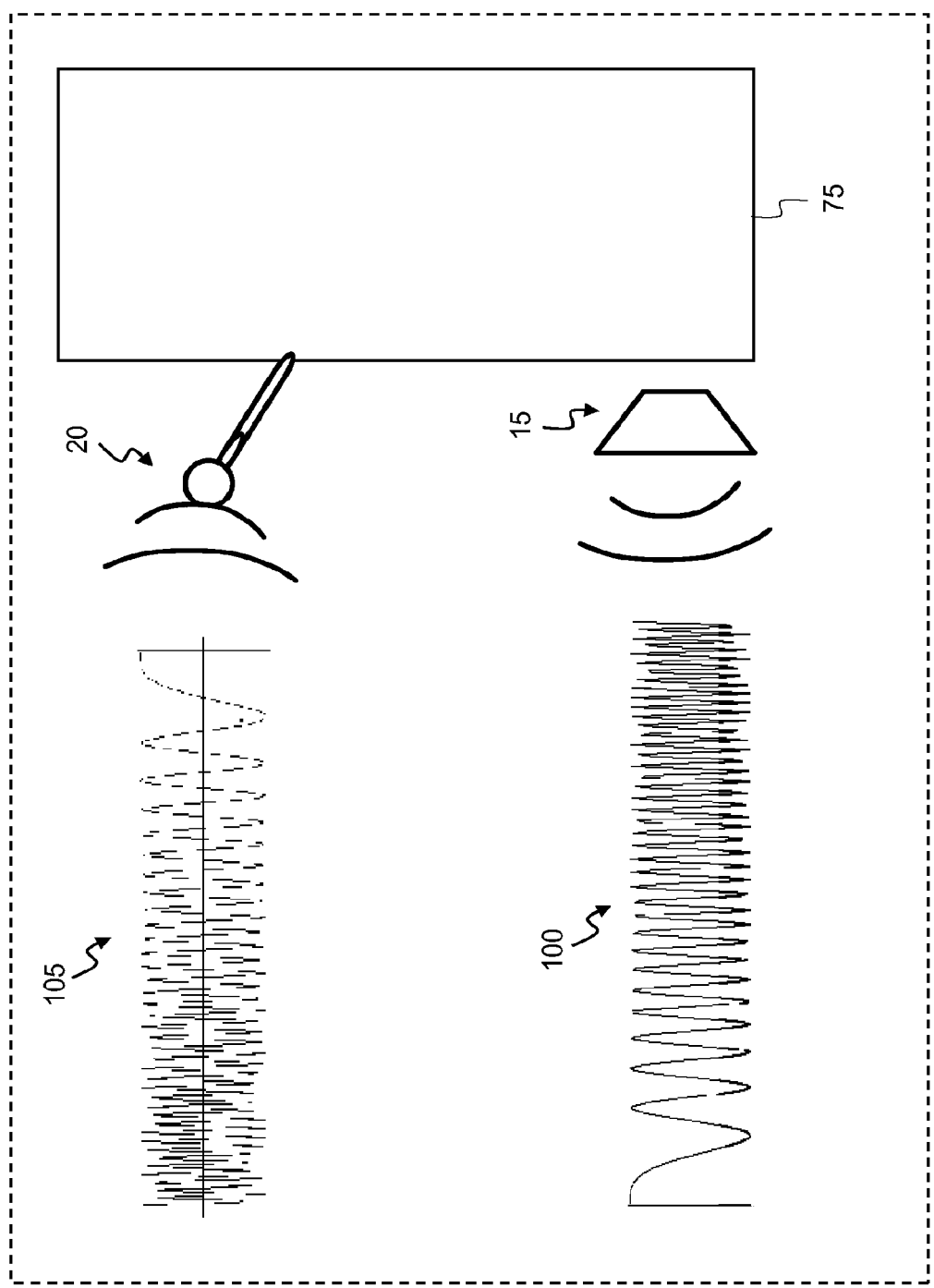
FIG. 3 depicts the emission and reception of a chirp signal that can be used with the present invention.

FIG. 3 depicts the audio emitting device 75 that is emitting a chirp signal 100 and receiving the chirp 105 after interacting with the enclosed or partially enclosed room. The parameters $\alpha$ and $\beta$ are determined for the amount of time desired to transmit the signal in Eq. 1. A typical time interval is 3 seconds. Using a chirp signal 100 requires that the received chirp 105 response from the enclosed or partially enclosed environment be correlated with the emitted chirp signal 100 stored in memory. The result of the correlation is known to be equivalent to the impulse response 60 and has the advantage of allowing for a significantly lower amplitude emission alleviating the annoying aspect associated with the impulse emission.

Another method that also has the attribute of being less annoying is to use random white noise of the same bandpass (20 Hz-20 KHz) as in the chirp. A typical time interval is 3 seconds. Just as in the case of the chirp the received random white noise chirp response from the enclosed or partially enclosed environment must be correlated with the emitted signal stored in memory. The result of the correlation is also known to be equivalent to the impulse response 60 and has the advantage of allowing for a significantly lower amplitude emission alleviating the annoying aspect associated with the impulse emission.

Using either the chirp or the random white noise has a further advantage in that the impulse response 60 derived from these methods is far more robust to the presence of ambient background sounds. It is possible, for example, to emit the chirp or the random white noise while music is being played.

The invention has been described with reference to a preferred embodiment. However, it will be appreciated that variations and modifications can be effected by a person of ordinary skill in the art without departing from the scope of the invention.

PARTS LIST

10 Audio Electrical Signal
15 Speaker
20 Microphone
25 Memory
30 CPU
35 D/A (Digital to Analog Converter)
40 A/D (Analog to Digital Converter)
45 Difference Operator
50 Voice Command
55 Operating Parameter
60 Impulse Response
65 Audio Signal
70 Convolution Operation
75 Audio Emission Device
80 Buffer memory
85 Square and sum
90 Threshold
95 Gate
100 Emitted Chirp
105 Received Chirp

The invention claimed is:

1. A method of controlling an operating parameter of an audio emitting device using voice commands in an enclosed or partially enclosed environment where the audio emission device is producing audio emissions in response to a received audio electrical signal, comprising:
    (a) storing an electrical impulse response signal of the enclosed or partially enclosed environment, wherein the impulse response signal is provided by emitting a short duration audio pulse into the enclosed or partially enclosed environment and measuring the sound characteristics of the impulse;
    (b) providing a microphone for receiving a voice command signal by a user and the audio emission from the audio emitting device to provide a composite electrical signal representing both the received audio emission and the received voice command signal;
    (c) forming a convolution of the electrical impulse response signal with the received audio electrical signal to produce a convolved electrical signal representing the audio emissions from the audio emitting device;
    (d) subtracting the convolved electrical signal from the composite electrical signal to produce a voice-command electrical signal; and
    (e) using the voice-command electrical signal to change an operating parameter of the audio emission device.

2. The method of claim 1 wherein the impulse response signal is provided by emitting a chirp audio signal into the enclosed or partially enclosed environment and converting the audio information formed by the chirp audio signal into the impulse response signal.

3. The method of claim 1 wherein the impulse response signal is provided by emitting a substantially white noise signal into the enclosed or partially environment and converting the audio information formed by the substantially white noise signal into the impulse response signal.

* * * * *